US005497653A

United States Patent [19]

Snow

[11] Patent Number: 5,497,653
[45] Date of Patent: Mar. 12, 1996

[54] METHOD AND SYSTEM FOR DETECTING SIGNIFICANT HYDRAULIC LEAKS

[75] Inventor: Barton H. Snow, Wyoming, Ohio

[73] Assignee: General Electric Company, Cincinnati, Ohio

[21] Appl. No.: 947,590

[22] Filed: Sep. 21, 1992

[51] Int. Cl.⁶ .............................. G01M 3/28; G01F 11/04
[52] U.S. Cl. ........................................................ 73/40.5 R
[58] Field of Search .................... 73/40.5 R, 40, 73/49.1, 49.2

[56] References Cited

U.S. PATENT DOCUMENTS 4,152,925  5/1979  Lindh .................................. 73/40.5 R

FOREIGN PATENT DOCUMENTS 2255353  6/1974  Germany ............................ 73/40.5 R
287329   2/1991  Germany ............................ 73/40.5 R
249668   12/1969 U.S.S.R. ............................. 73/40.5 R

*Primary Examiner*—Richard Chilcot
*Assistant Examiner*—George M. Dombroske
*Attorney, Agent, or Firm*—Andrew C. Hess; Patrick R. Scanlon

[57] ABSTRACT

A method of detecting hydraulic leaks from a high pressure fuel hydraulic system is useful in systems where a pump, actuators, and hydraulic lines are filled with engine fuel at high pressure. The method comprises the steps of calculating pump flow based on a core engine RPM and a pump displacement, and calculating actuator fluid flow. System condition signals are then generated to indicate whether the core engine RPM is constant and whether the actuators are quiescent. A servo flow value is then provided, typically at predetermined system conditions, as indicated by the system condition signals, using the pump flow calculation and the actuator fluid flow calculation. Finally, leak flow is determined based on the pump flow calculation, the actuator fluid flow calculation, and the servo flow value, and the leak flow is responded to accordingly.

14 Claims, 2 Drawing Sheets

METHOD AND SYSTEM FOR DETECTING SIGNIFICANT HYDRAULIC LEAKS

BACKGROUND OF THE INVENTION

The present invention relates to aircraft fuel systems and, more particularly, to an improved means of calculating hydraulic pump flow for detection of significant overboard leaks from a hydraulic system.

Aircraft fuel systems occasionally develop fluid leaks, such as during battle. The General Electric F414 engine proposes to use a fuel operated nozzle hydraulic pump. In this configuration, the pump, all actuators, and all hydraulic lines are filled with engine fuel at high pressure. If there is a significant hydraulic leak for any reason, then the aircraft fuel tank could be drained overboard. This can occur with any high pressure fuel hydraulic system.

Significant overboard leaks from a fuel hydraulic system, including engines employing axisymmetric vectoring exhaust nozzles, can drain the aircraft fuel tank before they are detected. Present day hydraulic systems using hydraulic fluids other than fuel are limited by the capacity of the hydraulic tank, typically under three gallons. Today, significant leaks are detected by visual means or by unusual behavior of an engine. However, when the engine operates normally in the presence of a leak, the hydraulic system increases flow up to the capacity of the hydraulic pump before the hydraulic pressure falters, and a leak can exist without detection.

It is therefore highly desirable and an object of the present invention to provide a means of detecting significant hydraulic leaks in any hydraulic system using any fluid, including oil or fuel.

Another object of the present invention is the provision of accurate pump flow measurements, making the present invention particularly adaptable for use with a system having an axisymmetric variable exhaust nozzle (AVEN). The accuracy of pump flow can be used to optimally determine hydraulic priority for an AVEN system.

Another object of the present invention is the provision for calculating and storing a flow level for servo flows. In a variable pressure system, these vary enough to create system tolerances which either open the threshold of leak detection, or, for axisymmetric variable exhaust nozzle systems, add to the flow capacity which cannot be consistently used.

These objects and other features and advantages will become more readily apparent in the following description when taken in conjunction with the appended drawings.

SUMMARY OF THE INVENTION

The present invention has been developed to fulfill the needs noted above. Briefly, in accordance with one aspect of the present invention, a method of detecting hydraulic leaks from a high pressure fuel hydraulic system is useful in systems where a pump, actuators, and hydraulic lines are filled with engine fuel at high pressure. The method comprises the step of calculating pump flow based on a calculation of delivered pump flow. Pump flow may be accomplished by either of two means. The first is from pump characteristics using pump drive RPM and a measurement of displacement, such as wobble plate angle; and the second is by calculation of flow usage from actuator rates and calculation of servo flow. The difference between these two means of calculating delivered pump flow, beyond a reasonable tolerance, is system overboard leakage. When detected, the system can be isolated, stopping the leak.

A more particular embodiment of the invention uses the accuracy of the servo flow to more accurately determine available pump flow for a system having an axisymmetric variable exhaust nozzle for a gas turbine engine.

In the drawings as hereinafter described, a preferred embodiment is depicted; however, various other modifications and alternative constructions can be made thereto without departing from the true spirit and scope of the invention.

DETAILED DESCRIPTION OF THE PREFERRED EMBODIMENTS

Figure 1:
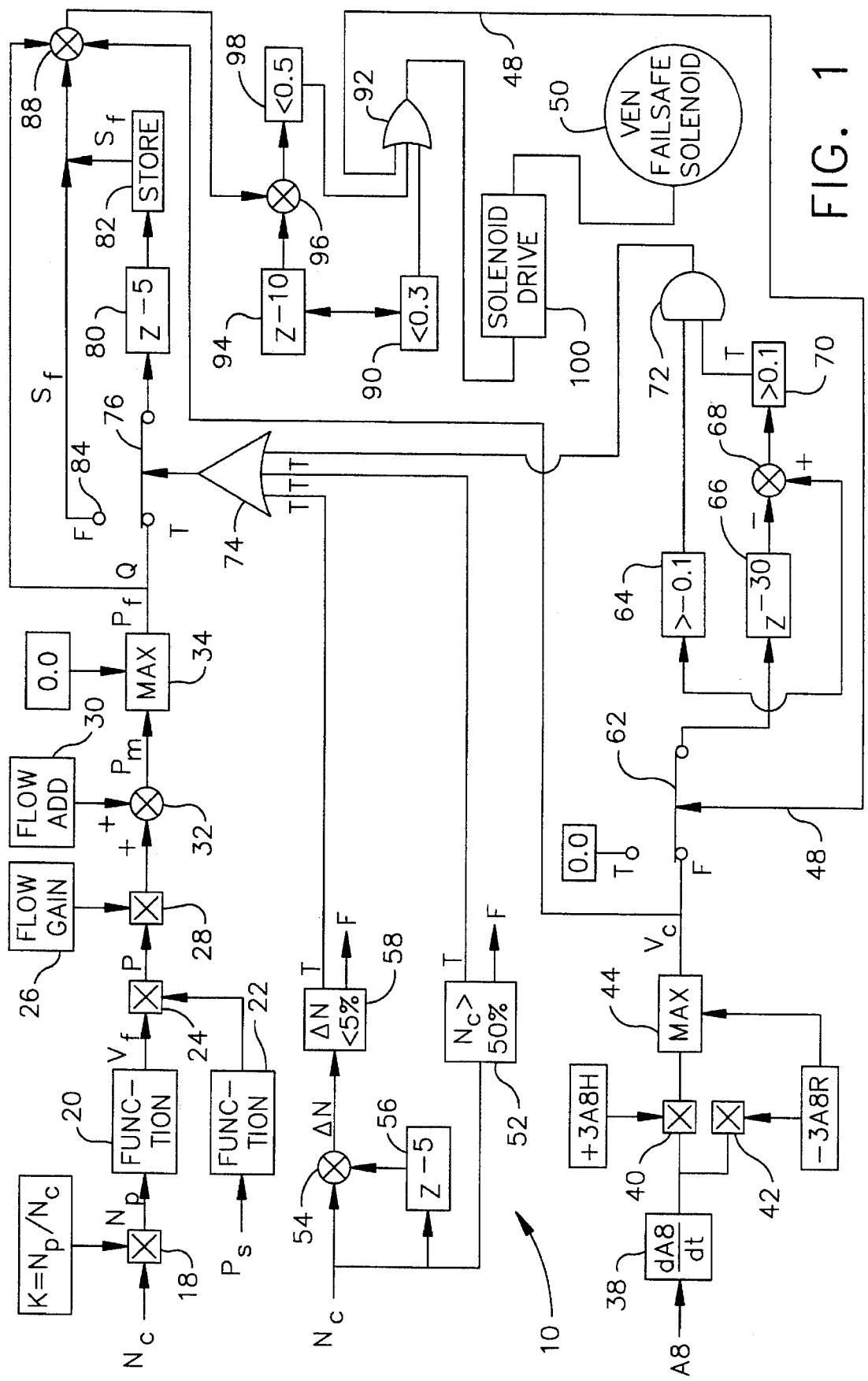
FIG. 1 is a schematic block diagram of a leak detection means, in accordance with one embodiment of the present invention.
Figure 2:
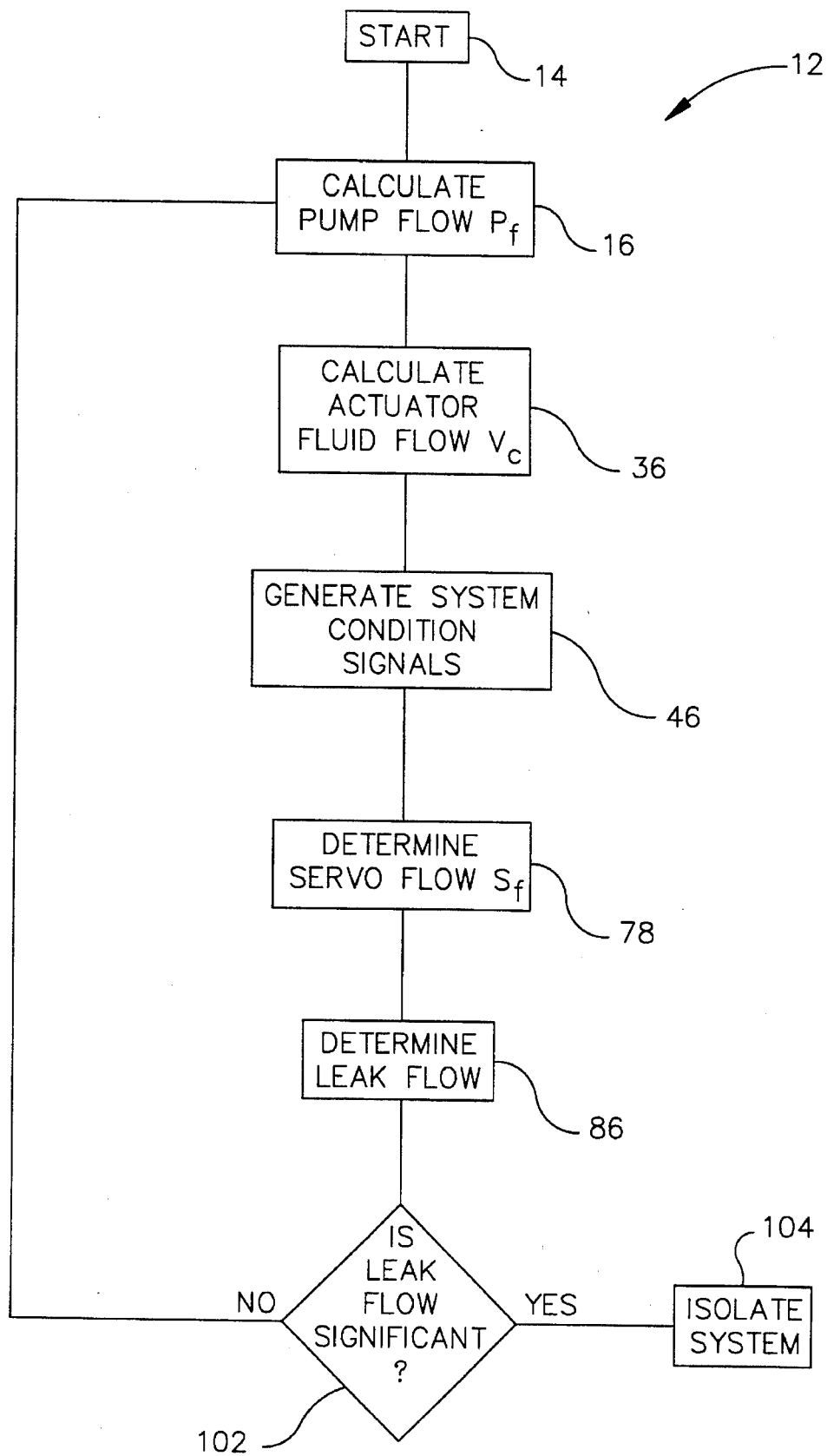
FIG. 2 is a schematic flow diagram of the leak detection means, using the detection of servo flow to assess available pump flow.

Referring now to the drawings, in FIG. 1 there is illustrated a schematic block diagram of a leak detection means 10 of the present invention. FIG. 2 illustrates a flow diagram 12 showing the sequence of steps used by the leak detection means 10 to detect significant hydraulic leaks from a high pressure hydraulic system in which a pump, actuators, and hydraulic lines are filled with fluid at high pressure. The fluid may be any suitable fluid, including oil or engine fuel.

As can be seen in FIG. 2, the leak detection sequence flow diagram starts at block 14 and then proceeds to block 16 where pump flow of the hydraulic system pump (not shown) is calculated. The calculation of pump flow is best illustrated in FIG. 1, where a first multiplier 18 multiplies a signal $N_c$, proportional to core engine RPM, by a constant K, representative of engine to pump drive gear ratio. The constant K is equal to $N_p/N_c$, where $N_p$ is the pump drive RPM and $N_c$ is the core engine RPM. The result from the first multiplier 18 is a signal $N_p$, proportional to pump drive speed, which is input to a first function generator 20. The output of the first function generator 20 is a signal $V_f$, representing the volumetric flow of the hydraulic pump at a fixed piston stroke.

Continuing with FIG. 1, a signal $P_s$, proportional to the piston stroke of the hydraulic pump is fed to a second function generator 22 which accommodates the geometric relationship between the stroke of the pump and the delivered flow value calculated. The output of the second function generator 22 is input to a second multiplier 24, along with the volumetric flow signal $V_f$, so flow at a fixed stroke is multiplied by a signal proportional to measured stroke to create a calculated pump flow signal P.

The pump flow signal P can be multiplied by a flow gain 26 at a third multiplier 28, or added to by a flow add signal 30 at a first summing junction 32. The flow gain 26 and the flow add signal 30 are provided to tune the results of the pump flow calculation, when desired. For example, a multiplier of 0.90 at the third multiplier 28 would provide a calculated flow which is 90% of actual flow, giving a 10% margin in later calculations. This is desirable for management of the delivered flow in an AVEN system.

The final pump flow signal $P_m$, as modified by any flow gain 26 or flow add signal 30, is compared with a constant 0.00, at a first maximum (MAX) signal selector 34, so that the net calculated output flow of the pump cannot be less than zero. This output signal, $P_f$, is the calculated delivered flow of the pump, and is used in further data processing, as indicated by the flow diagram 12 of FIG. 2. The pump flow may be determined using various calculations. For example, pump flow may be calculated from pump characteristics using pump drive RPM and a measurement of displacement, such as wobble plate angle. Alternatively, pump flow may be determined by calculation of flow usage from actuator rates and servo flow.

Referring again to FIG. 2, after calculating the pump flow $P_f$, the flow diagram 12 continues to block 36, where the actuator fluid flow is calculated. To calculate the actuator fluid flow, the jet nozzle actuator position A8 is processed at a derivative block 38 of FIG. 1 to become a derivative signal dA8/dt. The derivative signal may be either positive or negative, depending upon the direction of the A8 actuator piston stroke. The derivative value is then multiplied at a fourth multiplier 40, by a positive constant which represents the head area of the actuator times the number of actuators. The output from the fourth multiplier 40 is the volumetric fluid flow to and from the head end of the actuator. Similarly, the derivative value is multiplied at a fifth multiplier 42 by a negative constant which is three time the rod end area of the actuator. The resultant value from the fifth multiplier 42 represents the rod end volumetric flow.

At this point, a convention is applied which assigns a plus value for the derivative output from the derivative block 38 when the head end is stroked with high pressure fluid, and a minus sign to the direction of actuator stroke when the actuator is pressurized with fluid at the rod end. By assigning a negative value to the negative constant applied to the fifth multiplier 42, the output signal from the fourth multiplier 40 will be positive when the head end is supplied with high pressure fluid, and the output signal from the fifth multiplier 42 will be positive when high pressure fluid is supplied to the rod end of the actuator. Thus, when either signal from the multipliers 40 and 42 is positive, the value represents the volumetric flow of high pressure fluid to the actuators; and whenever either signal from the multipliers 40 and 42 is negative, the value represents the flow of low pressure fluid from the actuators. The two signals from the multipliers 40 and 42 are such that when one signal is positive the other is always negative. The comparison of the output signals from the multipliers 40 and 42, at a second MAX signal selector 44, produces the calculated high pressure actuator volumetric flow signal $V_c$.

Continuing with FIGS. 1 and 2, when the actuator fluid flow $V_c$ has been calculated, the flow diagram 12 of FIG. 2 proceeds to block 46, where system condition signals are generated. A primary purpose of generating system condition signals is to determine whether the RPM is constant (which indicates that the pump flow $P_f$ is constant), and whether the actuators are quiescent, i.e., have a rate of change equal to zero.

In the system conditions signal generating step 46, several condition signals are generated. Referring now to FIG. 1, a latch or actuation voltage signal 48 is set to "true" whenever a variable engine nozzle (VEN) failsafe solenoid 50 is powered and the nozzle hydraulic system is deactivated or isolated. The VEN failsafe solenoid 50 is preferably an on-off solenoid which hydraulically isolates the actuation system. It is powered when a leak is detected. Additionally, the operation of the solenoid 50 sets the latch 48, and opens a switch 62.

The core RPM signal $N_c$, used in the pump flow $P_f$ calculation determination, is compared with a 50% core RPM value at a first comparator 52. The output signal from the first comparator 52 is set to "true" if the core engine RPM signal $N_c$ is above 50%. The core engine RPM signal $N_c$ is also compared in a second summing junction 54, which is generated by a first function block 56. The first function block 56 provides the value of core RPM signal $N_c$ some predetermined frames, or computing intervals, ago. The predetermined number of frames is arbitrary, and may be any desired value, for example, five frames, or a processor minor frame of 0.015 seconds, where the value then is that of 0.075 seconds prior to the present value of the signal $N_c$. A long time selection is preferred as it is "noise free", but means that the system would have to be quiet longer to get a valid null determination, which in an active system might never happen. The ability to remember something for a period of time, for example 0.075 seconds, and then compare it with a new value, allows the determination of a change. In this case, the difference generated by the second summing junction 54 signal is the change in the signal $N_c$ over a 75 millisecond time interval. If the value is less than 5%, as determined by a second comparator 58, then the output signal from the second comparator 58 is set as "true".

Continuing with FIG. 1, when the actuation current signal 48 is false, then the signal 60, equal to the actuator fluid flow $V_c$, passes through a switch 62 and becomes a signal Q, representing the calculated flow of the actuators. If the signal Q is less than 0.1 Cu inch per second, as determined by a third comparator 64, the A8 system is deemed to be quiescent. Signal Q is also provided to a second function block 66 which stores the value, and outputs a signal $Q_p$, indicative of the Q value 30 frames ago, or 0.45 seconds past. The present value Q and the prior value $Q_p$ are summed at a third summing junction 68. The difference signal output by the third summing junction 68 is then checked at a fourth comparator 70. If the fourth comparator 70 finds the third summing junction 68 output to be less than 0.1 cu inch per second, the system is judged to have been quiescent for the past 0.45 seconds, and the output signal from the fourth comparator 70 is set to "true". When the output signals from the third comparator 64 and the fourth comparator 70 are both "true", then an AND gate 72 sets its output to be "true".

When these four conditions, (1) that the actuation current signal 48 is "true", (2) that the output of the first comparator 52 is "true", (3) that the output of the second comparator 58 is "true", and (4) that the output of the AND gate 72 is "false", are met, other signals are also set to "true". These other signals include a first OR gate 74 output, which causes a switch 76 to set its output to the "t" or "true" position. Whenever any one of the signals output from comparators 52 or 58, or AND gate 72, is "false", the output of the first OR gate 74 is also "false", causing the switch 76 to transfer to the "F" of "false" position. In this manner, the system can screen selected variables, and determine that the RPM is stable and within selected limits, and that the actuators are not moving.

Referring now to FIG. 2, after generating system condition signals at block 46, the flow diagram proceeds to block 78, where a servo flow value is provided. The servo flow value may be provided as a calculated value, or an assumed value. When servo flow is calculated, it is at predetermined system conditions as indicated by the system condition signals, using the pump flow calculation and the actuator fluid flow calculation. Alternatively, the servo flow value may be an assumed value, provided when the system condition signals at block 46 are satisfied.

When the four conditions above are met, the output flow of the pump, $P_f$, should be equal to servo flow. It is known that pump flow $P_f$ equals actuator flow $V_c$ plus servo flow $S_f$. Where this is untrue, then there is a leak in the system. Consequently, pump flow minus actuator flow minus servo flow should also be equal to zero. If the result is not zero and exceeds the calculation tolerance, then there is a leak in the system.

When the actuators are not moving, then the pump flow is equal to the servo flow. So when the four conditions relating to the generation of system condition signals at block 46 are met, then the actuators are quiescent, and pump flow equals servo flow. In a variable pressure, variable load actuation system, the value of servo flow will vary. The input to third function block 80 of FIG. 1 is the current value of servo flow. The third function block 80 saves the servo flow value for five frames, or 0.075 seconds. The output of the third function block 80 is stored in a memory 82, and updated every frame that the switch 76 is in the "true" position. By placing a servo flow signal $S_f$ on terminal 84, the updated and stored values of the servo flow remain constant at the last valid value of $S_f$ whenever the switch 76 is in the "false" position.

So when the actuators are quiet, servo flow can be determined, since servo flow in that instance is equal to the pump flow. The accuracy that goes with this determination of servo flow makes the present invention particularly applicable to systems having an axisymmetric variable exhaust nozzle. Not only can leak flow be determined, as described below in relation to block 86 of FIG. 2, but the available pump flow can be determined. It is desirable in an axisymmetric variable exhaust nozzle system to minimize weight and heat. The accuracy of the servo flow determination allows for a hydraulic priority determination, in turn allowing for a smaller capacity pump to satisfy the hydraulic demands of the system. The means of determining priority is disclosed in co-pending, commonly assigned patent application Ser. No. 07/571,043, and is incorporated herein by reference. Briefly, the functions are examined for several engine conditions and a priority "pecking order" is established. The order may change from condition to condition. If all of several actuators were simultaneously allowed full capability, the pump might be three times as large. The flow management scheme allows one hydraulic system to use what it needs, while the other hydraulic systems are fully or partially inhibited.

Under all normal circumstances, the sum of the signals $V_c$ and $S_f$ should equal the total of the pump flow $P_f$. In the event abnormal flow is detected, it is assumed to be external leakage, and the system is isolated so the leak flow can be determined, as indicated at block 86 of FIG. 2. The isolation can occur by subtracting the actuator flow and servo flow signals from the pump flow signal, at fourth summing junction 88 in FIG. 1. The difference output from the fourth summing junction 88 is compared with a limit value of, for example, 0.3 cu in/min at a fifth comparator 90. The limit value may be any desired value, but is preferably selected to be greater than 0.1 gallons per minute used for actuation quiescence, by an amount assumed for the tolerances of measurements and calculations. When the output of the fourth summing junction 88 exceeds the limit value, the output of the fifth comparator 90 is set to "true" at the input to a second OR gate 92. This is set because the abnormal flow is determined to be an external leak.

The output signal from the fourth summing junction 88 is also sent to a fourth function block 94, which recalls the value ten frames past, roughly 0.15 seconds ago, and compares it with the present value at a fifth summing junction 96. The output from the fifth summing junction 96 represents a change in flow in a 0.15 second interval. If the change is greater than 0.5 cu inch per second, as determined at a sixth comparator 98, then the output of the sixth comparator 98 is set to "true".

Continuing with FIG. 1, when either of the signals into the OR gate 92 is "true", the output of the OR gate 92 is "true", and a solenoid drive 100 provides the actuation current signal 48 to the VEN failsafe solenoid 50. A solenoid drive is an electronic chip which converts small signals into larger currents suitable for operation of a solenoid, and the solenoid in this case is a solenoid valve. The drive operates a coil which operates a plunger, which opens and closes a valve. The valve (not shown) provides a system shut off by any one of several schemes known in the art. The actuation current signal 48 is also used to latch the solenoid drive 100 by placing itself as one of the inputs to the OR gate 92. The actuation current signal is further used to trip switch 62, which provides a zero input to the second function block 66 and the remainder of the circuit 10. In this way, aerodynamic forces which might result in jet nozzle actuator movement due to depressurization are ignored in the leakage calculation.

Continuing with FIG. 2, then, the final step in the flow diagram 12 of FIG. 2 is to respond to the leak flow calculation, as indicated at decision block 102. If the leak flow is excessive, the hydraulic system is isolated, as shown by block 104. Alternatively, if the leak flow determination does not indicate a significant hydraulic leak, then the flow diagram returns to block 16, and refines the pump flow calculation.

The present invention provides for a means of detecting significant hydraulic leaks in any hydraulic system using fuel. The present invention is particularly adaptable for use with a system having an axisymmetric variable exhaust nozzle, because the accuracy of servo flow can be used to determine hydraulic priority.

It is seen from the foregoing, that the objectives of the present invention are effectively attained, and, since certain changes may be made in the construction set forth, it is intended that matters of detail be taken as illustrative and not in a limiting sense.

What is claimed is:

1. A method of detecting hydraulic leaks from a high pressure hydraulic system in which a pump, actuators, and hydraulic lines are filled with fluid at high pressure, the method comprising the steps of:

calculating pump flow;

calculating actuator fluid flow;

generating system condition signals to indicate a core engine RPM related to the pump flow calculation, and quiescence of the actuators;

providing a servo flow value when the systems condition signals are satisfied;

determining leak flow based on the pump flow calculation, the actuator fluid flow calculation, and the servo flow value; and responding to the leak flow determination.

2. A method of detecting hydraulic leaks as claimed in claim 1 wherein the step of calculating pump flow comprises the steps of:

calculating pump drive RPM; and measuring pump displacement.

3. A method of detecting hydraulic leaks as claimed in claim 1 wherein the step of calculating pump flow comprises the steps of:

calculating pump drive RPM; and assuming a value indicative of pump displacement.

4. A method of detecting hydraulic leaks as claimed in claim 1 wherein the step of calculating pump flow comprises the steps of:

calculating flew usage from actuator rates; and calculating servo flow.

5. A method of detecting hydraulic leaks as claimed in claim 1 wherein the step of providing a servo flow value comprises the step of calculating a servo flow value at predetermined system conditions as indicated by the system condition signals, using the pump flow calculation and the actuator fluid flow calculation.

6. A method of detecting hydraulic leaks as claimed in claim 1 wherein the step of providing a servo flow value comprises the step of assuming a servo flow value.

7. A method of detecting hydraulic leaks as claimed in claim 1 wherein the step of determining leak flow comprises the steps of:

calculating pump flow use; and comparing the calculated pump flow use with a calculated maximum pump flow to indicate reserve pumping capacity.

8. A system for detecting hydraulic leaks from a high pressure hydraulic system in which a pump, actuators, and hydraulic lines are filled with fluid at high pressure, the system comprising:

means for calculating pump flow;

means for calculating actuator fluid flow;

means for generating system condition signals to indicate a core engine RPM related to the pump flow, and quiescence of the actuators;

means for providing a servo flow value when the system condition signals are satisfied;

means for determining leak flow based on the pump flow calculation, the actuator fluid flow calculation, and the servo flow value; and means for responding to the leak flow determination.

9. A system for detecting hydraulic leaks as claimed in claim 8 wherein the means for calculating pump flow comprises:

means for calculating pump drive RPM; and means for measuring pump displacement.

10. A system for detecting hydraulic leaks as claimed in claim 8 wherein the means for calculating pump flow comprises:

means for calculating pump drive RPM; and an assumed value indicative of pump displacement.

11. A system for detecting hydraulic leaks as claimed in claim 8 wherein the means for calculating pump flow comprises:

means for calculating flow usage from actuator rates; and means for calculating servo flow.

12. A system for detecting hydraulic leaks as claimed in claim 8 wherein the means for providing a servo flow value comprises means for calculating a servo flow value at predetermined system conditions as indicated by the system condition signals, using the pump flow calculation and the actuator fluid flow calculation.

13. A system for detecting hydraulic leaks as claimed in claim 8 wherein the means for providing a servo flow value comprises an assumed servo flow value.

14. A system for detecting hydraulic leaks as claimed in claim 8 wherein the means for determining leak flow comprises:

means for calculating pump flow use; and comparison means for comparing the calculated pump flow use with a calculated maximum pump flow to indicate reserve pumping capacity.

* * * * *